(12) United States Patent
Minneman et al.

(10) Patent No.: US 9,057,665 B2
(45) Date of Patent: Jun. 16, 2015

(54) SYSTEM AND METHOD UTILIZING TIME-SLICE-ERADICATION TO ELIMINATE THE EFFECTS OF WAVELENGTH NON-LINEARITIES FROM SWEPT-WAVELENGTH TESTING OF OPTICAL COMPONENTS FOR SOURCES WITH NON-LINEARITIES

(75) Inventors: Michael Minneman, Lafayette, CO (US); Michael Crawford, Lafayette, CO (US); Jason Ensher, Lafayette, CO (US)

(73) Assignee: Insight Photonic Solutions, Inc., Lafayette, CO (US)

( * ) Notice: Subject to any disclaimer, the term of this patent is extended or adjusted under 35 U.S.C. 154(b) by 514 days.

(21) Appl. No.: 13/555,105

(22) Filed: Jul. 21, 2012

(65) Prior Publication Data

US 2013/0046499 A1 Feb. 21, 2013

Related U.S. Application Data

(60) Provisional application No. 61/510,769, filed on Jul. 22, 2011.

(51) Int. Cl.
*G06F 19/00* (2011.01)
*G01M 11/00* (2006.01)

(52) U.S. Cl.
CPC .......... *G01M 11/3127* (2013.01); *G01M 11/00* (2013.01); *G01M 11/335* (2013.01)

(58) Field of Classification Search
CPC A61B 5/0095; A61B 8/4416; G06F 7/70633; G06F 7/70683
USPC ........................................... 702/85, 182–185
See application file for complete search history.

(56) References Cited

U.S. PATENT DOCUMENTS

2011/0248166 A1* 10/2011 Diem et al. .................. 250/330

* cited by examiner

*Primary Examiner* — Edward Raymond
(74) *Attorney, Agent, or Firm* — Renner, Otto, Boisselle & Sklar, LLP

(57) ABSTRACT

A system and method for correcting non-linearities in the output of a tunable laser over a sweep range. Electromagnetic radiation is directed over a range of wavelengths to a measurement system from the tunable laser source, wherein the measurement system collects data over the range of wavelengths. The electromagnetic radiation emitted over the range of wavelengths is monitored. A non-linearity in one or more wavelengths over the range of wavelengths is determined. A signal is transmitted to the measurement system to cease collecting data when the one or more wavelengths having the non-linearity is output from the tunable laser source or the data is ignored.

15 Claims, 3 Drawing Sheets

Figure 1: Typical Time-slice Non-linearity Effects

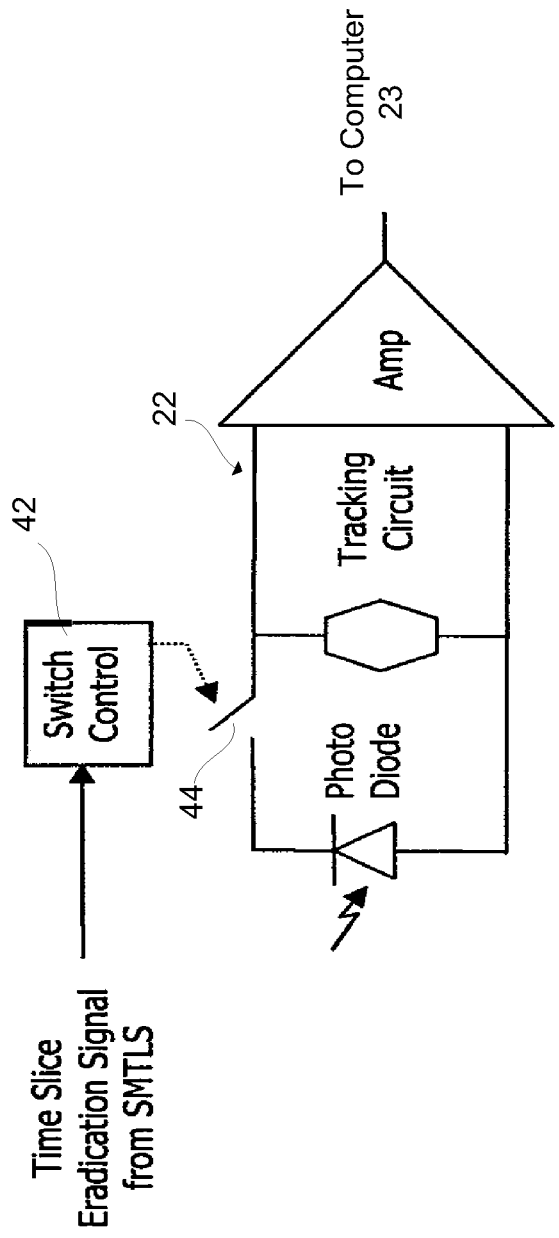
Figure 3: Time-Slice Eradication in Analog Measurement Circuit

US 9,057,665 B2

SYSTEM AND METHOD UTILIZING TIME-SLICE-ERADICATION TO ELIMINATE THE EFFECTS OF WAVELENGTH NON-LINEARITIES FROM SWEPT-WAVELENGTH TESTING OF OPTICAL COMPONENTS FOR SOURCES WITH NON-LINEARITIES

RELATED APPLICATION DATA

This application claims the benefit of U.S. Provisional Application No. 61/510,769, filed Jul. 22, 2011, which is hereby incorporated in by reference.

TECHNICAL FIELD

The present invention relates generally to a system and a method to utilize time-slice-eradication to eliminate the effects of wavelength non-linearities from swept-wavelength testing of optical components for laser sources with non-linearities.

BACKGROUND

Vernier-tuned Sampled Grating Distributed Bragg Reflector (VTDBR) monolithic tunable lasers are now entering the production phase in telecommunications applications. These tunable lasers are unique in that they offer wide wavelength tuning (e.g., 1525 to 1565 nm) and fast wavelength tuning (e.g., full sweep in microseconds) all on the same monolithic chip. Such a tunable laser will be referred to herein as a Semiconductor Monolithic Tunable Laser Source (SMTLS). SMTLS have a characteristic sweep that is very short. However, the sweep may include potentially impactful non-linearities in the wavelength sweep. These non-linearities could be as short as 100 s of ns, or longer.

A typical measurement system begins measurement at the beginning of a wavelength sweep by the SMTLS, and uses the sweep rate to determine the wavelength at subsequent times during the sweep using the formula $$WL_a = WL_{start} + time_a * \text{sweep rate}$$

For this formula to be accurate, the sweep must be linear with time.

Alternatively, a swept wavelength meter can be used to determine the wavelength at each point during the sweep. An exemplary wavelength meter may be a model 410 Wavelength Meter manufactured by dBm Optics.

There are two effects from short-period non-linearities. First, the measurements made during the period of non-linearity are not representative of the actual results at those predicted wavelengths. Second, the potentially large amplitude variations that can occur during these non-linearities in wavelength (due to relatively high change in loss versus wavelength of a measured device in the vicinity of the non-linearity) can cause the measurements immediately following the non-linearity to be incorrect, due to explicit or implicit filtering of the signal. For example, the signal may jump to a much larger signal during a non-linearity, and even after the non-linearity, the signal may not have settled back to the nominal level due to filter settling time.

SUMMARY

Due to the unique nature of the non-linearities in an SMTLS, it is possible to have exact information about where these non-linearities will occur during the sweep. This information may be used to change the way the measurement system utilizes its response to avoid the non-linearity errors.

One aspect of the invention relates to a method of correcting a non-linearity in a tunable laser source, the method includes: directing electromagnetic radiation over a range of wavelengths to a measurement system from the tunable laser source, wherein the measurement system collects data over the range of wavelengths; monitoring the electromagnetic radiation emitted over the range of wavelengths; determining a non-linearity in one or more wavelengths over the range of wavelengths; and transmitting a signal to the measurement system to cease collecting data when the one or more wavelengths having the non-linearity is output from the tunable laser source.

Another aspect of the invention relates to a method for collecting data from a tunable laser source having one or more nonlinearities occurring when the tunable laser source is swept over a range of wavelengths, the method includes: directing electromagnetic radiation from the tunable laser source over the range of wavelengths to a measurement system, wherein the measurement system collects data over the range of wavelengths; determining one or more non-nonlinearities in the collected data; and storing the one or more non-linearities in an electronic storage device communicatively coupled to the measurement system.

Another aspect of the invention relates to a system for correcting data based on a non-linearity in a tunable laser source, the system includes: a tunable laser source for directing incident electromagnetic energy over a range of wavelengths; a measurement system for detecting electromagnetic radiation from the tunable laser source; and a storage device communicatively coupled to the measurement system for storing data representative of one or more optical characteristics associated with wavelength of the incident electromagnetic energy detected by the measurement system; and a processor communicatively coupled to the storage device, wherein the processor executes an algorithm for correcting data associated with non-linearities from the tunable laser source.

A number of features are described herein with respect to embodiments of the invention. It will be appreciated that features described with respect to a given embodiment also may be employed in connection with other embodiments.

The invention comprises the features described herein, including the description, the annexed drawings, and, if appended, the claims, which set forth in detail certain illustrative embodiments. These embodiments are indicative, however, of but a few of the various ways in which the principles of the invention may be employed.

BRIEF DESCRIPTION OF THE DRAWINGS

In the annexed drawings:

FIG. 3 illustrates an exemplary analog measurement circuit in accordance with aspects of the present invention.

DESCRIPTION

Figure 1:
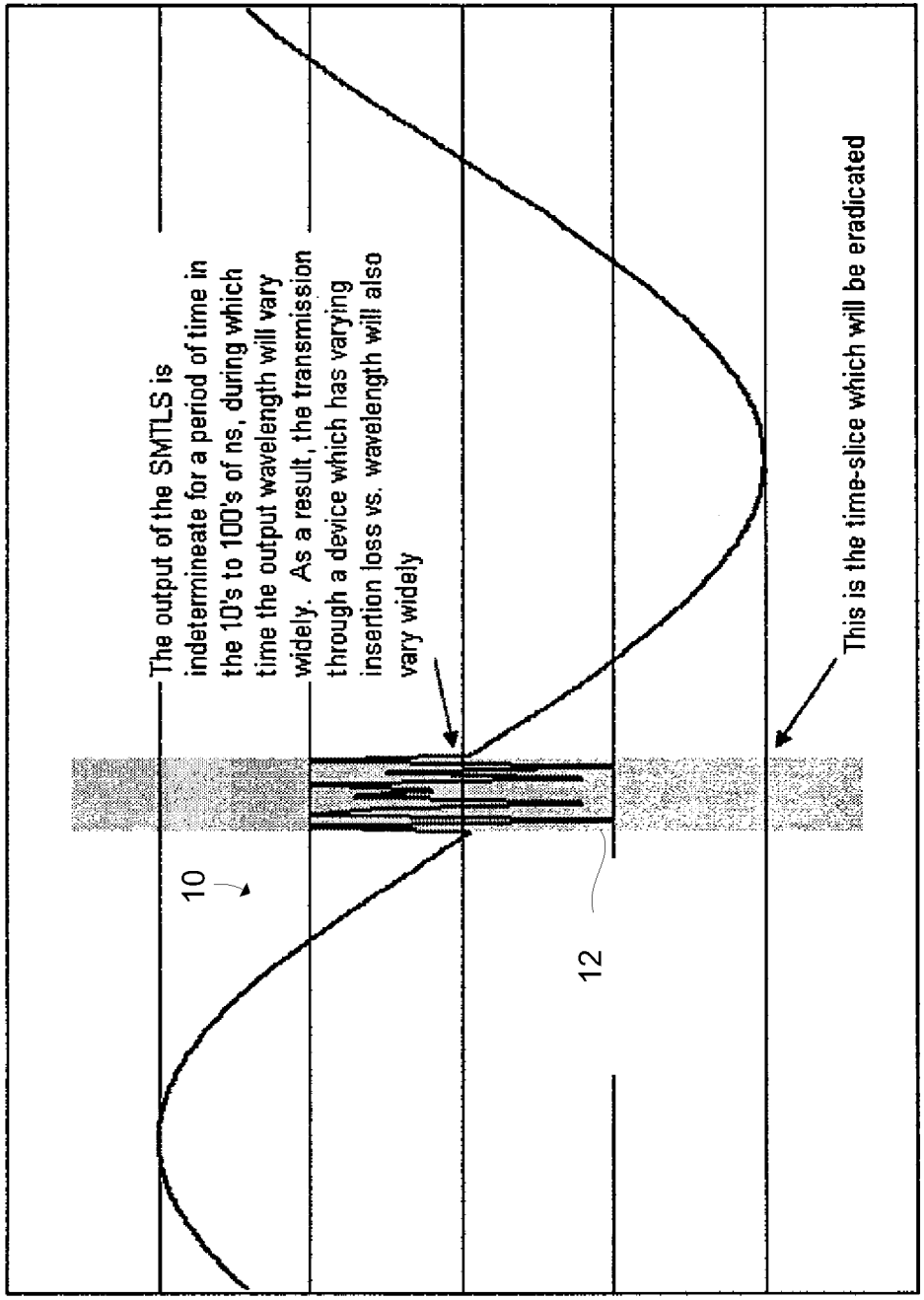
FIG. 1 illustrates an exemplary non-linearity signal effect of a SMTLS.
Figure 2:
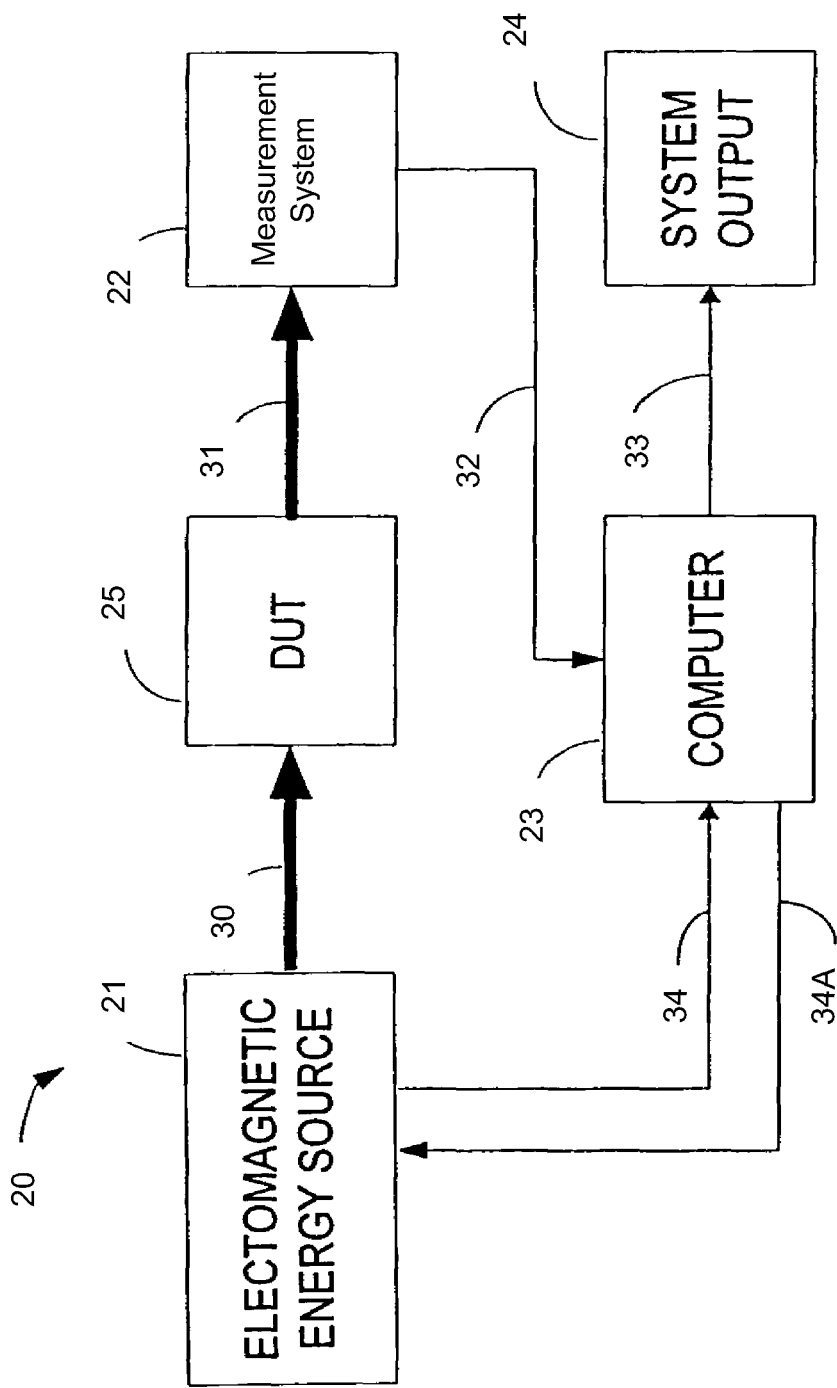
FIG. 2 illustrates an exemplary system in accordance with aspects of the present invention.

Referring to FIG. 2, an optical testing system 20 (also referred to as optical measurement system) is illustrated. The optical testing system 20 includes an electromagnetic energy source 21, a measurement system 22, a computer 23 and a system output 24. A device under test (DUT) 25 is placed in the optical testing system 20, and in operation of the optical testing system the DUT 25 may be characterized. In characterizing the DUT 25 incident electromagnetic energy 20 is provided to the DUT 25, and output electromagnetic energy 31 from the DUT 25 is detected by the measurement system 22 and may be used to obtain characteristics of the DUT 25, as will be described further below.

If the non-linearities of source 21 is detected, corrections, adjustments, etc., in the data for characterizing the DUT 15 can be made to account for the non-linearities. This capability to the non-linearities and to accommodate errors in the measurement data allows the possibility to use in the measurement system 20 less expensive electromagnetic energy sources.

The electromagnetic energy source 21 provides electromagnetic energy over a range of wavelengths. The range may be a continuous range, for example, as in an analog signal that changes continuously from one wavelength to another without discrete steps in between the wavelengths. Alternatively or additionally, the range may include a number of distinct wavelengths that are between respective wavelength values at respective opposite ends of the range. The wavelength range may be the visible range of wavelengths or part of the visible range, may be in the ultraviolet, infrared, or some other range, or may be a combination or part or all of the mentioned and/or other ranges. The range may be continuous or may include discontinuous portions. An exemplary wavelength range is from about 1520 nm to about 1620 nm. One of ordinary skill in the art will readily appreciate that the invention may be used with other wavelengths and wavelength ranges.

An example of such an electromagnetic energy source 21 is a SMTLS, and the invention will be described below with respect to a SMTLS that provides a laser beam (sometimes referred to as light but may be other electromagnetic energy) 30 as incident electromagnetic energy to the DUT 25. It will be appreciated that other types of electromagnetic sources may be used and fall within the spirit and scope of the present invention. For convenience and brevity the electromagnetic energy from the electromagnetic energy source will be referred to as laser beam 30 or simply as light or light beam. The sweep of the SMTLS may be very fast, thus allowing the measurement system 20 to fully examine the power spectrum of light from a DUT in a time frame that is in the second to microsecond (µs) range.

The term "swept", as used herein, means that the SMTLS 21 provides its light output at a number of wavelengths over a range of wavelengths. That the wavelengths are "over" a range or "in" a range does not require that all wavelengths are used in the range, although use of all may be possible, for example, if the optical testing system 20 can use, e.g., produce and detect, all wavelengths in the range. A TLS 21 may have a sweep cycle; it may have periodic operation whereby the light output periodically and repeatedly is produced as light 30 that is swept over such range.

The light 30 from the TLS 21 is incident on the DUT 25, and light 31 from the DUT, e.g., transmitted or reflected thereby, is sensed or detected by the measurement system 22 to provide an output signal on line 32 that is representative of the sensed or detected light 31. The signal on line 32 may be provided the computer 23 (or to another computer or computational device), and/or to an amplification or other signal conditioning circuit (not shown); and the resulting amplified, conditioned or otherwise adjusted signal on line 33 is provided via the system output 24. The system output 24 may include the mentioned and/or other amplification, signal conditioning, computational, control, etc. circuitry or may include other circuitry for the purpose of obtaining useful system output information and/or signal for characterizing the DUT 25.

In an exemplary optical testing system 20, the computer 23 coordinates operation of the SMTLS 21 with the signal on line 33 to the system output 24. Therefore, as the SMTLS moves, scans, sweeps, etc. through the wavelengths of light it produces, the system output information is representative of characteristics of the DUT 25 as the DUT receives incident light 30 at respective wavelengths. As one example, such coordination between the SMTLS 21 operation and the measurement system 22 output signal on line 32 may be achieved by a signal from the SMTLS provided on line 34 to the computer 23 so the computer is "aware" of the wavelength or other characteristic of the light produced by the SMTLS. As another example, the computer 23 may provide a control signal on line 34a to the SMTLS to "direct" or to instruct the SMTLS to produce a given light output. Coordination between the SMTLS 21 and computer 23 also may be based on time, whereby a timing signal may be used to indicate that the SMTLS is starting (or is elsewhere in) its scan cycle or period; and based on what are supposed to be known characteristics of the SMTLS, the wavelength of its output at subsequent times would be expected. Other possibilities for such coordination also are possible.

In a first embodiment of a system 20, the SMTLS 21 is configured to communicate with the measurement system 22. For example, the SMTLS 22 may communicate with the measurement system 22 to identify when the non-linearities occur in the SMTLS may occur. Analog signals that correspond with the non-linearites may then be interrupted from the measurement system 22. The interrupted data may be ignored such that it does not impact the analog measurement circuitry, for example.

In another embodiment, the tunable laser source (e.g., an SMTLS) can provide a gating signal to the measurement trigger, which may stop monitoring the signal during the occurrence of the non-linearities to avoid having the circuitry negatively affected by the potentially large amplitude changes during the non-linearity.

In another embodiment, the settling time of the measurement analog circuitry may be addressed by adding a switched sample and hold circuit to the front end, as illustrated in FIG. 3. Referring to FIG. 3, a time slice eradication signal is received from the SMTLS at a switch control 42, which controls operation of switch 44. When the switch is closed, the measurement system 22 collects data. When the switch is open, for example, when a non-linearity is imminent, data is not collected by the measurement system 22. Such a control mechanism allows the system to replace the signal input to the measurement circuit 22 with a sampled version prior to the non-linearity and held at that value until the end of the non-linearity. Once the non-linearity is over, then the switch 44 may be closed and the signal is once again connected to the measurement system 22, for example. Since the variation in the nominal value of the signal would typically be much smaller than the variation during the non-linearity, the resulting settling time would be much smaller. In fact, by controlling the SMTLS appropriately, the value of the wavelength immediately after the eradicated time-slice can be made to be identical to that just prior to it.

Although the invention is shown and described with respect to illustrative embodiments, it is evident that equivalents and modifications will occur to those persons skilled in the art upon the reading and understanding hereof. The present invention includes all such equivalents and modifications and is limited only by the scope of the claims if appended hereto.

What is claimed is:

1. A method of correcting a non-linearity in a tunable laser source, the method comprising:
   directing electromagnetic radiation over a range of wavelengths to a measurement system from the tunable laser source, wherein the measurement system collects data over the range of wavelengths;
   monitoring the electromagnetic radiation emitted over the range of wavelengths;
   determining a non-linearity in one or more wavelengths over the range of wavelengths; and
   transmitting a signal to the measurement system to cease collecting data when the one or more wavelengths having the non-linearity is output from the tunable laser source.

2. The method of claim 1, wherein data is collected in an array of data.

3. The method of claim 2, wherein data occurring at the non-linearity is replaced with sampled data occurring prior to the non-linearity.

4. The method of claim 2, wherein data occurring at the non-linearity is replaced with data consistent with data immediately prior to the non-linearity.

5. The method of claim 1, wherein the tunable laser source is a semiconductor monolithic tunable laser source.

6. A method for collecting data from a tunable laser source having one or more nonlinearities occurring when the tunable laser source is swept over a range of wavelengths, the method comprising:
   directing electromagnetic radiation from the tunable laser source over the range of wavelengths to a measurement system, wherein the measurement system collects data over the range of wavelengths;
   determining one or more non-nonlinearities in the collected data; and
   storing the one or more non-linearities in an electronic storage device communicatively coupled to the measurement system.

7. The method of claim 6 further comprising directing the electromagnetic radiation over the range of wavelengths and through a device under test.

8. The method of claim 7 further comprising collecting device under test data over the range of wavelengths.

9. The method of claim 8, wherein the device under test data occurring at the end of one or more non-nonlinearities is replaced with device under test data immediately prior to the one or more non-linearities.

10. The method of claim 7 further comprising providing a control signal to the measurement system, wherein the control signal is operative to instruct the measurement system not to acquire device under test data occurring at the one or more non-linearities.

11. A system for correcting data based on a non-linearity in a tunable laser source, the system comprising:
   a tunable laser source for directing incident electromagnetic energy over a range of wavelengths;
   a measurement system for detecting electromagnetic radiation from the tunable laser source;
   a storage device communicatively coupled to the measurement system for storing data representative of one or more optical characteristics associated with wavelength of the incident electromagnetic energy detected by the measurement system; and a processor communicatively coupled to the storage device, wherein the processor executes an algorithm for correcting data associated with non-linearities from the tunable laser source.

12. The system of claim 11, wherein the tunable laser source is a semiconductor monolithic tunable laser source.

13. The system of claim 11 further including a switch operable in a first position to control the measurement system such that when the tunable laser source is outputting electromagnetic radiation at a wavelength having a non-linearity, the switch disengages the measurement system from collecting data.

14. The system of claim 13, wherein the switch is operable in a second position to allow the measurement system to collect information when the tunable laser source is outputting electromagnetic radiation at a wavelength having a linearity.

15. The system of claim 11, wherein the algorithm replaces data consistent with data immediately prior to a detected non-linearity.

* * * * *